US012657414B2

(12) United States Patent
Smith et al.

(10) Patent No.: US 12,657,414 B2
(45) Date of Patent: *Jun. 16, 2026

(54) METHODS AND SYSTEMS FOR FUSING LOCKED USER GENERATED CONTENT IN A BOOK HAVING PAGES INTERSPERSED WITH OPTICALLY READABLE CODES

(71) Applicant: Yellow Multimedia Corporation, Florence, KY (US)

(72) Inventors: Latonya Smith, Florence, KY (US); Pierre Brown, Florence, KY (US)

(73) Assignee: YELLOW MULTIMEDIA CORPORATION, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/891,743

(22) Filed: Sep. 20, 2024

(65) Prior Publication Data

US 2025/0124245 A1 Apr. 17, 2025

Related U.S. Application Data

(63) Continuation-in-part of application No. PCT/US2024/017027, filed on Feb. 23, 2024, which (Continued)

(51) Int. Cl.
*G06K 7/14* (2006.01)
*G06K 1/12* (2006.01)

(52) U.S. Cl.
CPC ........... *G06K 7/1417* (2013.01); *G06K 1/121* (2013.01)

(58) Field of Classification Search
CPC ... G06K 7/1417; G06K 1/121; G06K 16/9554
See application file for complete search history.

(56) References Cited

U.S. PATENT DOCUMENTS 11,934,914 B1 * 3/2024 Smith ................. G06F 16/9554
2004/0088326 A1 5/2004 Lin
(Continued)

FOREIGN PATENT DOCUMENTS

BR 102018014314 A2 1/2020
KR 101952647 B1 2/2019

OTHER PUBLICATIONS

Elen Mesropyan: "From Page to Screen: Exploring Movies and Comics with Scannable QR Codes". Critical Blast, Jun. 21, 2023, Retrieved from the internet < URL:http://www.criticalblast.com/articles/2023/06/21/page-screen-exploring-movies-and-comics-scannable-qr-codes>.

(Continued)

*Primary Examiner* — Matthew Mikels
(74) *Attorney, Agent, or Firm* — Vorys, Sater, Seymour and Pease, LLP; Michael Messinger

(57) ABSTRACT

Methods and systems for generating content for a story in a book having pages interspersed with optically readable codes and intermission optically readable codes. To consume an entire story, a person reads text on pages in some book sections and uses an optical scanning device to scan optically readable codes on pages in other book sections and access digital media files. Intermission optically readable codes may further be scanned to unlock user functionality on a remote device. Each intermission optically readable code permits access to a user-generated content platform, whereby users may create, share, and consume content with other users regarding the story of the book. A book may have an alternating sequence of chapters presented with textual content and other chapters presented with audiovisual content accessed by optically readable codes to cover an entire story and intermission optically readable codes to engage with a community and supplement the story.

7 Claims, 15 Drawing Sheets

Related U.S. Application Data is a continuation of application No. 18/379,573, filed on Oct. 12, 2023, now Pat. No. 11,934,914.

(56)                  References Cited

U.S. PATENT DOCUMENTS

| | | | |
|---|---|---|---|
| 2006/0124742 | A1 | 6/2006 | Rines |
| 2013/0334300 | A1 | 12/2013 | Evans |
| 2014/0310380 | A1 | 10/2014 | Newman |
| 2014/0339296 | A1 | 11/2014 | McAdams |
| 2016/0350066 | A1 | 12/2016 | Poswal |
| 2017/0039768 | A1 | 2/2017 | Kim |
| 2017/0200390 | A1 | 7/2017 | Seymour |
| 2017/0352187 | A1* | 12/2017 | Haines ................. G06T 19/006 |
| 2021/0103786 | A1* | 4/2021 | Yoshida ................ H04L 9/0861 |
| 2021/0255759 | A1 | 8/2021 | Farrell |
| 2025/0124245 | A1 | 4/2025 | Smith et al. |

OTHER PUBLICATIONS

Adele Ankers-Range: "She-Hulk Includes QR Codes That Link to Free Marvel Comics." Aug. 25, 2022, Retrieved from the Internet <URL:https://www.ign.com/articles/she-hulk-qr-codes-free-marvel-comics>.

J.W. Warren: "The College Cookbook: 101 Simple, Cheap and Healthy Recipes with QR Code Video Demonstrations." Apr. 29, 2023, Retrieved from the Internet <URL:https://www.amazon.com/College-Cookbook-Healthy-Recipes-Demonstrations/dp/B0C2SFNHMJ>.

"The first cookbook of its kind!" Copyright 2023 Retrieved from the Internet <URL:https://madeitateitlovedit.com/cookbook/order/>.

Robyn Albertyn: "How to Find a Marvel QR Code in Ms. Marvel and She-Hulk." Oct. 12, 2022, Retrieved from the Internet <URL:https://www.qr-code-generator.com/blog/marvel-qr-code-in-shows/>.

Mike Matas: "A Next-generation digital book." TED Talk, Apr. 28, 2011, Retrieved from the Internet <URL:https://www.youtube.com/watch?v=LV-RvzXGH2Y>.

"What is LIT Videobooks." LIT Videobooks, Jan. 31, 2022, Retrieved from the Internet <URL:https://www.youtube.com/watch?v=Mj8z5UFbjug>.

"Every Hidden QR Code in She-Hulk: Attorney at Law." Rocket Riley, Oct. 18, 2022 Retrieved from the Internet <URL: https://www.youtube.com/watch?v=tk6kSJQ2jFU>.

International Search Report and Written Opinion filed in corresponding application PCT/US2024/017027, dated Jun. 18, 2024, 9 pages.

International Search Report and Written Opinion issued in corresponding PCT Application PCT/US2025/046937; dated Jan. 14, 2026; 9 pages.

Remento, "How to Add and Manage Prompts", Remento Help Center, downloaded Feb. 17, 2026, 6 pages. https://help.remento.co/en/articles/8365920-how-to-add-and-manage-prompts.

Remento, "Frequently asked questions (FAQ)", Remento, copyright 2025, downloaded Feb. 17, 2026, 8 pages. https://www.remento.co/faq.

Remento, "Remento vs Storyworth - Remento, the Storyworth alternative." The Wayback Machine, Aug. 7, 2024, 4 pages. https://web.archive.org/web/20240807100139/https://www.remento.co/remento-vs-storyworth.

Remento, "As Seen on Shark Tank", Remento, downloaded Feb. 17, 2026, 5 pages. https://www.remento.co/.

Remento, "Faq Questions?", The Wayback Machine, Sep. 14, 2024, 2 pages. https://web.archive.org/web/20240914164545/https://www.remento.co/faq.

Remento, "Turn memories into a keepsake book. No writing required." The Wayback Machine, Aug. 15, 2024, 6 pages. https://web.archive.org/web/20240815022721/https://www.remento.co/.

Remento, "Remento Reviews: Perspectives from Remento customers and their families", Remento, Apr. 2024, 11 pages.

* cited by examiner

A method for producing content for a story
in a book having multiple pages
500

Replacing sections of a book
with respective optically readable codes
510

Creating Digital Media files covering content
corresponding to the replaced sections
520

Storing digital media files in computer-readable memory
accessible by a server
530

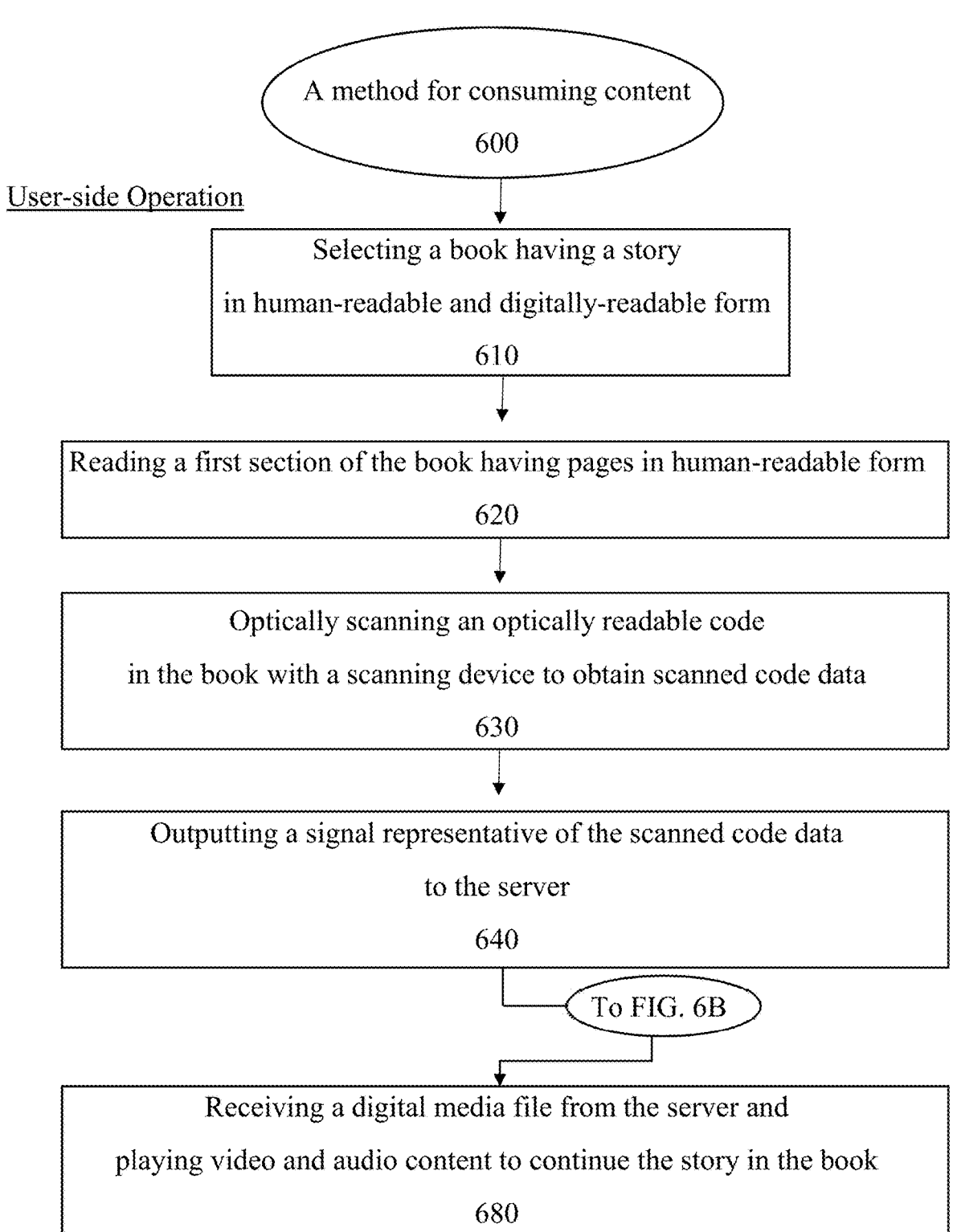

A method for consuming content

600

User-side Operation

Selecting a book having a story in human-readable and digitally-readable form

610

Reading a first section of the book having pages in human-readable form

620

Optically scanning an optically readable code in the book with a scanning device to obtain scanned code data

630

Outputting a signal representative of the scanned code data to the server

Receiving a digital media file from the server and playing video and audio content to continue the story in the book

Server-side Operation

A method for generating content for a story in a book having multiple pages
800

Creating digital media files covering content
810

Storing digital media files in computer-readable memory
accessible by a server
820

Placing intermission optically readable codes between two sections of the book that permit access to a user-generated content platform
830

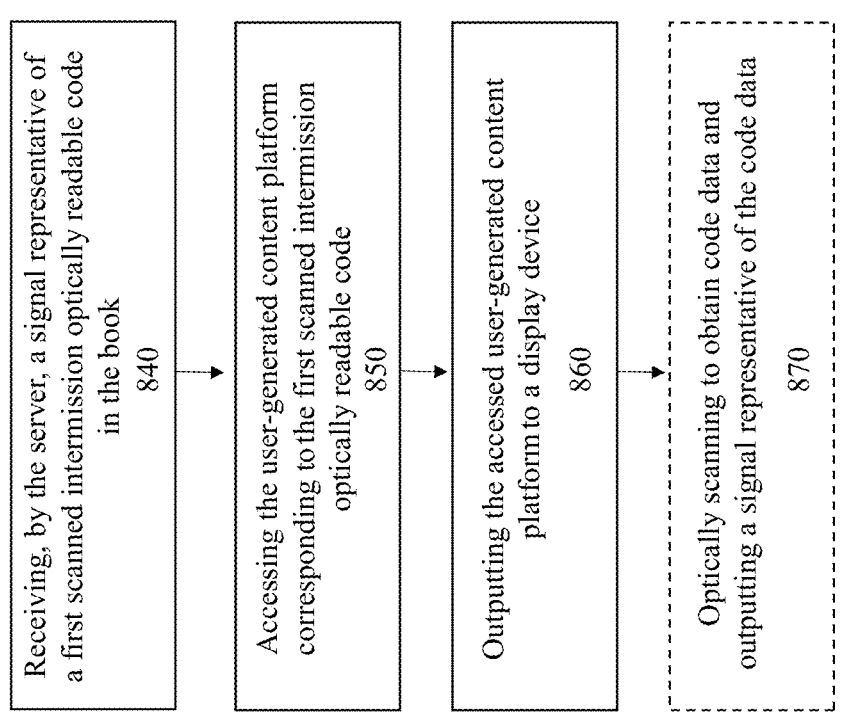

Receiving, by the server, a signal representative of a first scanned intermission optically readable code in the book
840

Accessing the user-generated content platform corresponding to the first scanned intermission optically readable code
850

Outputting the accessed user-generated content platform to a display device
860

Optically scanning to obtain code data and outputting a signal representative of the code data
870

1212
Written Portion (text)

Book

Accessing comment section (Viewing Content added to the book by other owners of the same title)

METHODS AND SYSTEMS FOR FUSING LOCKED USER GENERATED CONTENT IN A BOOK HAVING PAGES INTERSPERSED WITH OPTICALLY READABLE CODES

CROSS-REFERENCE TO RELATED APPLICATIONS

This application is a continuation-in-part of PCT Application No. PCT/US24/017027, filed Feb. 23, 2024 (pending) which claims the benefit of U.S. application Ser. No. 18/379, 573 filed Oct. 12, 2023 (now U.S. Pat. No. 11,934,914), each of which is incorporated by reference in its entirety herein.

FIELD OF THE DISCLOSURE

The technical field relates generally to electronic content presentation and storytelling.

BACKGROUND OF THE DISCLOSURE

When reading a novel, memoir, autobiography, or any other genre in traditional text within a book, the reader is left to visually interpret the story using their own imagination unless illustrations are provided within the text. Pictures within books have long assisted authors in expressing their vision, but still images remain eclipsed by the expressive potential of motion film and video.

Scannable codes have been used in books and in television programming to facilitate access to supplemental content. QR codes are machine-readable codes consisting of an array of black and white squares, typically used for storing URLs or other information to be read by the camera on a smartphone. These codes can deliver supplemental content to enhance any content-consuming experience. For example, creators have developed cookbooks that provide a QR Code leading to a video demonstration of the written instructions for each recipe. Recently filmmakers have positioned QR codes throughout their television series, which—upon scanning—the viewer would receive a free comic book unrelated to the current episode. Further, interactive eBooks have used both electronic text and links to audio or video files without scannable codes. However, all these conventional techniques fail to fuse both printed text and video content to present a continuous story.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one embodiment, a book having content for a story includes a book binding and a plurality of pages held in place by the book binding, and first and second groups of sections. The first group of sections has at least textual content on pages covering respective portions of the story. The second group of sections has optically readable codes on pages, wherein the optically readable codes encode information to access respective digital media files having audiovisual content covering respective portions of the story different than the portions of the story covered by the first group of sections, and wherein the first and second groups of sections cover the entire story of the book.

In another embodiment, a method for generating content for a story in a book having multiple pages is provided. The method includes replacing one or more sections of a book with one or more respective optically readable codes corresponding to replaced sections, and storing one or more digital media files in computer-readable memory accessible by a server. Each digital media file has video and audio content covering a portion of the story of a respective replaced section of the book. Each optically readable code identifies a respective digital media file. In this way, a person reading the book with an optical scanning device may read text on pages in some sections of the book and use the optical scanning device sections to scan optically readable code on pages in other sections of the book and access digital media files to consume the content of the entire story in the book.

In another embodiment, a system for serving content for a story in a book having multiple pages with textual content interspersed with one or more optically readable codes is provided. The system includes a server configured to receive from a remote device a signal representative of a first scanned optically readable code in the book, access a digital media file corresponding to the first scanned optically readable code, and output the accessed digital media file to the remote device for display to a user, whereby, a user reading the book with an optical scanning device may read the textual content on pages in some sections of the book and use an optical scanning device to scan optically readable codes on pages in other sections of the book and access respective digital media files to consume the content of the entire story in the book.

In another embodiment, a method for generating content for a story in a book having multiple pages across different sections interspersed with optically readable codes is provided. The method includes storing one or more digital media files in computer-readable memory accessible by a server, and placing intermission optically readable codes between two sections of the book. Each optically readable code unlocks user-functionality on an optical scanning device and permits a user to access a user-generated content platform. In this way, a person reading the book with an optical scanning device may read text on pages in some sections of the book and use the optical scanning device sections to scan intermission optically readable code on pages in other sections of the book and access a user-generated content platform to consume and create supplemental content among other owners of the book.

Any combinations of the various embodiments and implementations disclosed herein can be used in a further embodiment consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIGS. 6A and 6B are flowchart diagrams of a method for consuming content with respective user-side and server-side operations according to an embodiment of the present invention.

FIG. 9 is a flowchart diagram of a method for generating content for a story in a book having multiple pages according to an embodiment of the present invention.

DETAILED DESCRIPTION

Figure 1:
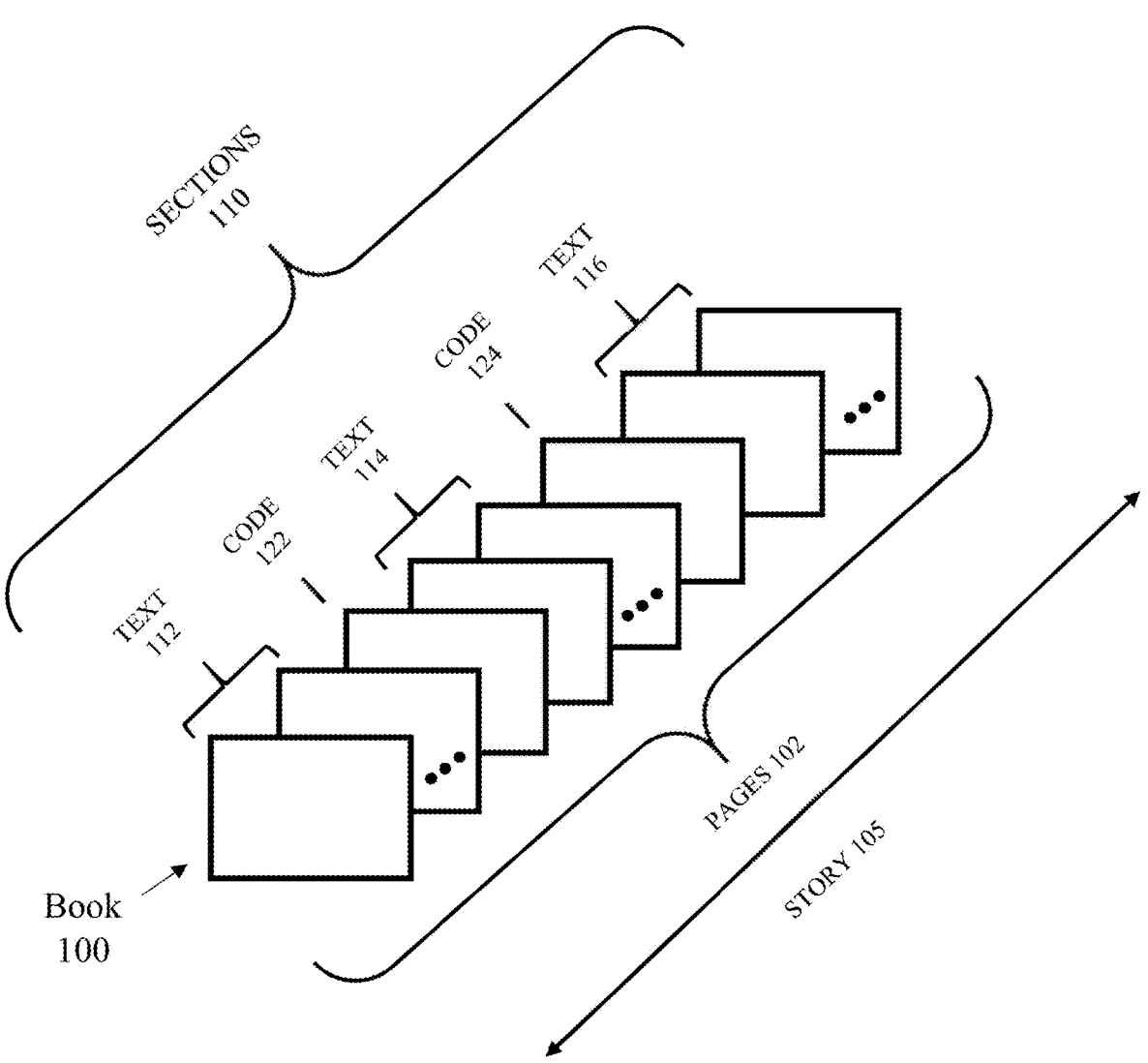
FIG. 1 is a diagram of a book having pages interspersed with optically readable codes according to an embodiment of the present invention.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to electronic content presentation and storytelling.

A Book of Fused Content

FIG. 1 is a schematic diagram of a book 100 having content for a story 105 presented in a plurality of pages 102 according to an embodiment. In one example, pages 102 may be held in place by a cover and book binding.

Book 100 has sections 110 made up of a group of sections having textual content 112, 114, 116 interspersed with another group of sections having optically readable codes

122, 124. Optically readable codes 122, 124 encode information to access respective digital media files having audiovisual content. This audiovisual content covers respective portions of story 105 differently than the portions of story 105 covered by the textual content 112, 114, 116. In this way, textual content and audiovisual content are fused in multiple sections which allows a user to experience story 105 in book 100 through both reading pages and viewing audiovisual content.

Figure 2:
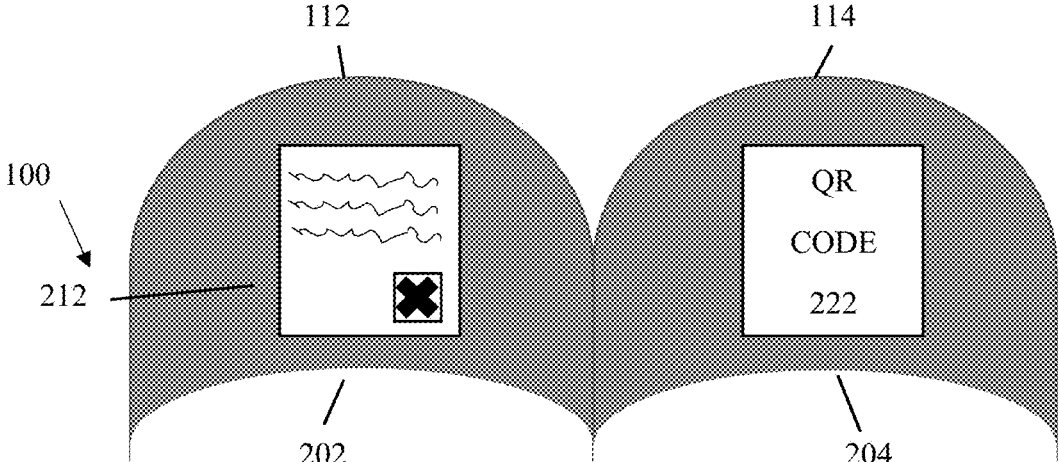
FIG. 2 shows an example of two pages having textual content and an optically readable code for accessing a digital media file having audiovisual content in the same story according to an embodiment of the present invention.

To read book 100, a user may read pages having textual content 112, 114, 116 and scan codes optically readable codes 122, 124 to view the respective digital media files and consume the entire story 105. For example, as shown in further detail in FIG. 2, textual content 112 may be printed in section 212 on a left side page 202 of book 100 when opened. An optically readable code, such as, a QR code 222, may be printed on a right side page 204 of book 100. Section 212 for example may have text for a user to read. Section 212 may also have an image or an illustration for a user to view on page 202. When the user turns to page 204, the user can use a scanner, such as a scanner application on a mobile phone, to scan QR code 222. QR code 222 may encode information identifying a web address which can access a respective digital media file with audiovisual content in the same story as the content in section 212.

Book to Film System

Figure 3:
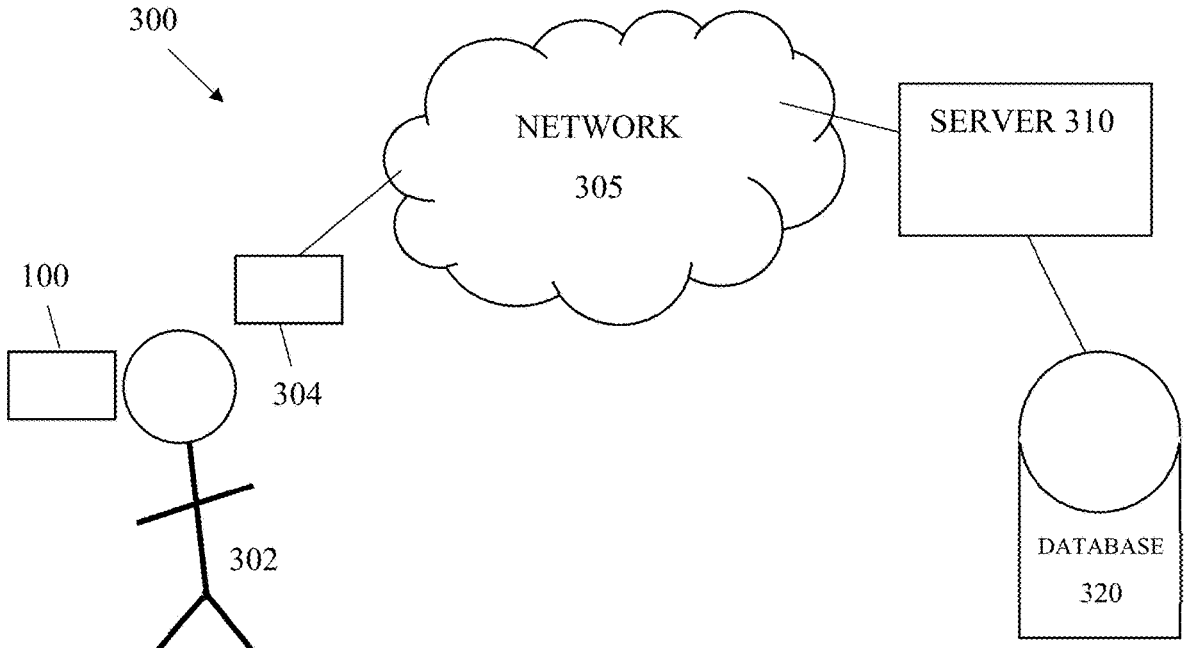
FIG. 3 is a system for generating content according to an embodiment of the present invention.

FIG. 3 is a diagram of a system 300 for serving content for a story in a book 100 having fused textual and audiovisual content according to an embodiment. System 300 includes a server 310 coupled over a data network 305 to one or more remote devices 304. Server 310 is configured to communicate with remote devices 304 over data network 305. A database 320 is coupled to server 310, and configured to store one or more digital media files. Each digital media file may be identified by a respective file name. Remote devices 304 may be one more computing devices operated by respective users 302. Server 310 may be implemented on one or more computing devices. Data network 305 may be any type of computer data network or combination of networks such as the Internet.

In operation, a user 302 may read book 100 while operating a remote device 304, such as a mobile device including a smart phone, that can communicate with server 310. Server 310 is configured to receive signals from remote devices 304 that represent the information in scanned optically readable codes 222 in the book, access the digital media files 400 corresponding to that optically readable code 222, and then output the digital media file 400 to the remote device 304 for display to a user 302.

Figure 4:
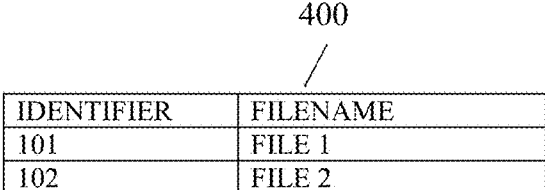
FIG. 4 shows an example lookup table for identifier and file name data.

In one embodiment, as shown in FIG. 4, a look up table 400 may be stored in computer-readable readable memory on server 310. Look up table 400 associates an identifier with a respective digital media file name. In this way, each QR code 222 may encode information about the identifier. Server 310 may then processed the scanned code and extract the identifier. Alternatively, the remote device 304 may process the scanned code and extract the identifier and send the identifier to server 310.

In one embodiment, QR code may encode information on a file identifier along with an address for a server 310 (or other content server). For example, QR code may include information representative of a URL address for a content server at or accessible by server 310 and a file identifier for accessing a respective digital media file. Server 310 can then output the digital media file to the remote device 304 for display. For example, once an identifier is received, server 310 uses look up table 400 to determine a respective file name and sends a request for the digital media file based in the file name to database 320. Database 320 returns the digital media file to server 310 for forwarding to remote device 304 for viewing by user 302.

Alternatively, the remote device 304 may process the scanned code and extract the URL address and a file identifier for accessing a respective digital media file from a content server hosting the digital media file and retrieve the file for display on the remote device 304.

Look up table 400 is illustrative and not intended to be limiting. Other types of information may be used to identify a stored digital media file or its address as would be apparent to a person skilled in the art given this description. Similarly, other types of information may be encoded in a QR code or other type of code to enable server 310 to access a respective stored digital media file.

The operation of system 300 is further described below with respect to computer-implemented methods for producing and consuming content in FIGS. 5-6 and an illustrative diagram in FIG. 7.

Generating Content for a Story

Figure 5:
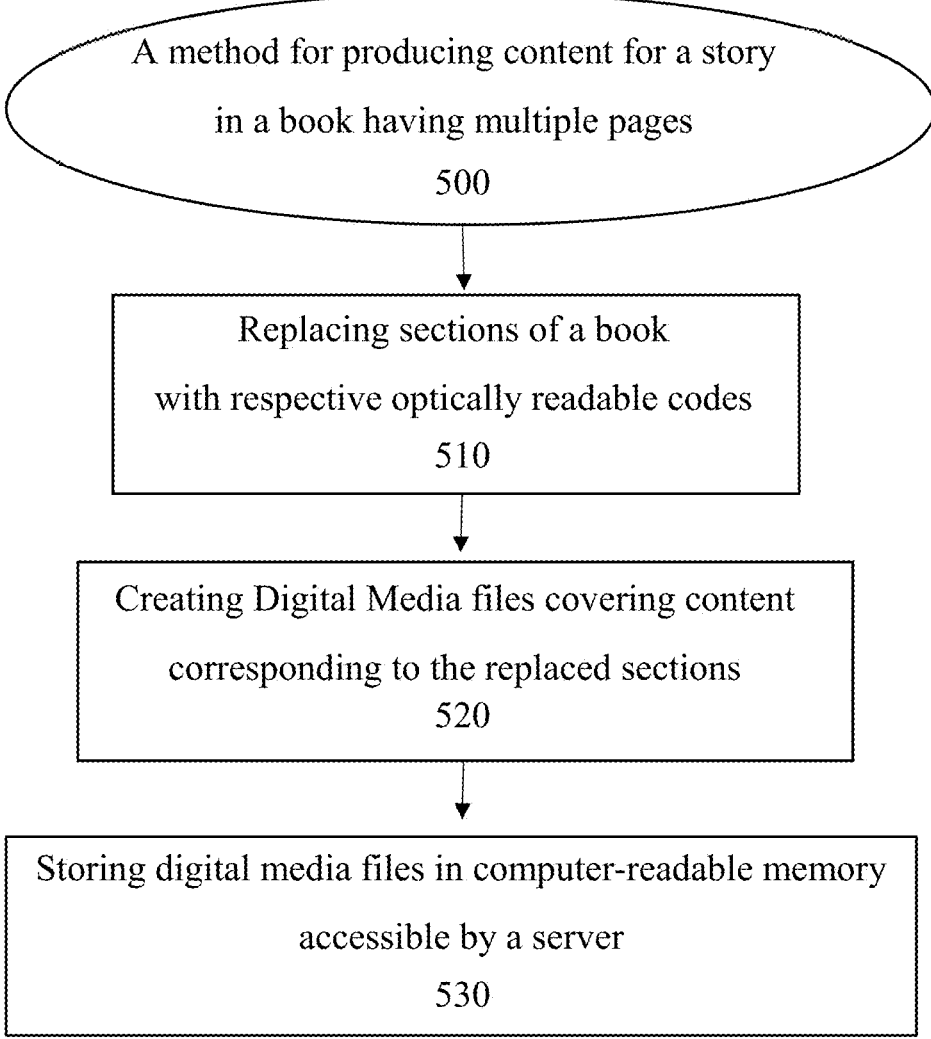
FIG. 5 is a flowchart diagram of a method for producing content according to an embodiment of the present invention.

FIG. 5 is an example method 500 for producing content for a story in a book having multiple pages (steps 510-530). At step 510, one or more sections of the book are replaced with one or optically readable codes corresponding to the replaced sections.

In step 520 digital media files are created having video and audio content covering the portion of the story of the respective replaced section of the book in step 510. In step 530, one or more digital media files are stored in computer-readable memory accessible by a server. The digital media files contain video and audio content covering portions of the story of the respective replaced sections of the book.

For example, to create a new fused work from an existing book, a producer in step 510 may begin select a second group of sections of the existing book to replace. In step 520, a producer may then record audiovisual content for the second group of sections. The producer may then process the recorded audiovisual content to obtain one or more digital media files. The digital media files may then be stored in computer-readable memory accessible by a content server (step 530). In this way, each digital media file has video and audio content covering a respective portion of the story in the second group of sections.

Optically readable codes may then be created using a QR code generator. The QR codes correspond to the respective stored digital media files. Then a book is printed having multiple pages including pages with the original authored textual content and optically readable codes on pages in the replaced sections.

For example, a producer may wish to produce a fused book relating to The Odyssey by Homer made up of 24 chapters (also called books in some translations). A producer in step 510 may decide to replace Chapter 2 Telemachus Sets Sail and Chapter 22 Slaughter in the Hall with audiovisual content. The producer then records or accesses audiovisual content for these replaced sections, and processes the recorded audiovisual content to obtain corresponding digital media files (step 520). The audiovisual content covers the story content of Chapter 2 and 22. The digital media files may then be stored in computer-readable memory accessible by a content server in step 530. The producer may then use a QR code generator to generate QR codes for respective stored digital media files. Then the producer prints a book having multiple pages including pages with the original authored textual content of The Odyssey along with optically readable codes (QR codes) on pages in the replaced sections for Chapter 2 and Chapter 22.

In still further examples, a producer may produce content for an entirely new work. In this case, in step 510 rather than replace sections of an existing work, a producer can draft textual content for a first group of sections. Likewise, in step 520, the producer of the new work would record audiovisual content for a second group of sections. Digital media files (stored in step 530) and corresponding optically scannable codes would also be generated.

For example, a producer may create a new book where half of the chapters are written in text. The other half of the chapters are created via animation and voice acting and recorded in digital media files. These video portions are then processed and uploaded and stored online in digital media files, where they can later be accessed by readers scanning the corresponding QR code located within the pages of the book.

Consuming Fused Book-to-Film Content

Figure 6B:
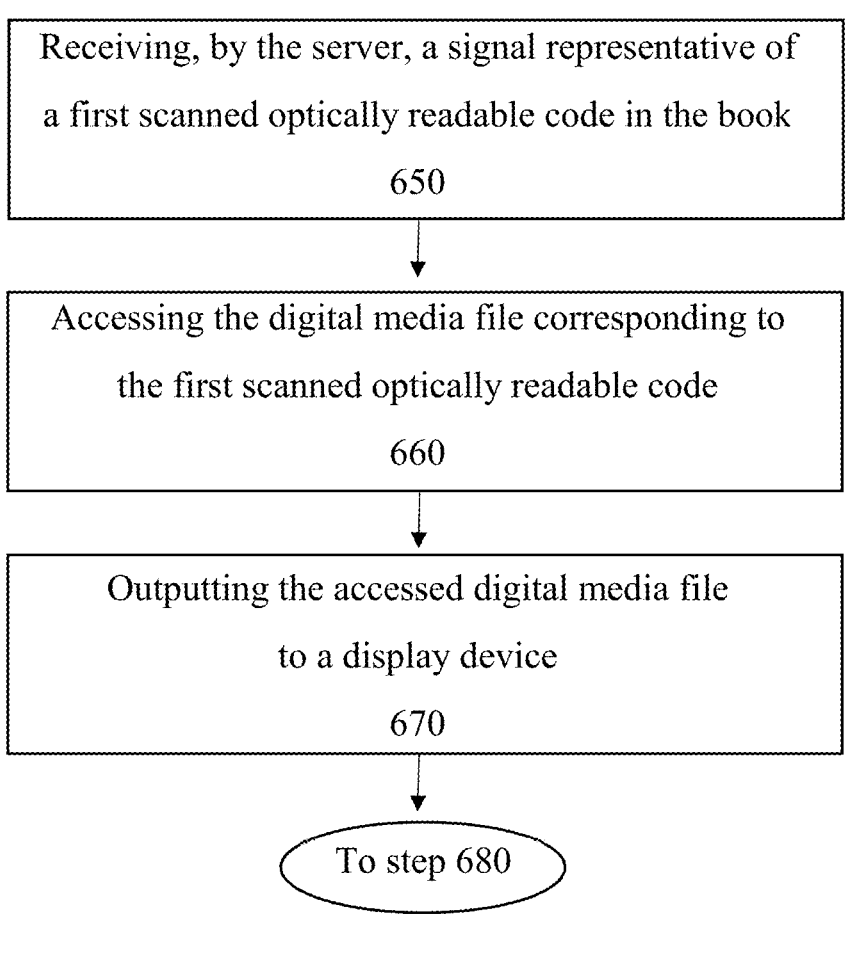

FIGS. 6A and 6B show a method 600 for consuming fused book-to-film content for a story in a book having multiple pages according to an embodiment (steps 610-680). Method 600 includes user-side and server-side operations. For brevity reference is made to system 300 but method 600 may be used with other system configurations.

First, a user selects a book having a story in human-readable and digitally readable form (step 610). The user then reads a first section having pages in human-readable form (step 620). Next, when a user encounters a page with an optically readable code, the user optically scans the optically readable code on the page with a scanner (step 630). For example, the user may use a scanner provided on a remote device 304 (such as a mobile device like a smartphone having a camera and a QR code processing application). Next control proceeds to output a signal representative of the scanned code information to a server (step 640). For example, an application on remote device 304 may send a signal with the scanned code information to server 310.

On the server-side as shown in FIG. 6B, the signal representative of the scanned code information is received (step 650). Server 310 may then access the digital media file corresponding to the scanned code information (step 660). For example, if already done by the mobile device, server 310 may extract a URL address and file identifier. Server 310 may then make a request to a content server or database 320 using the URL address and file identifier to request the digital media file. When the digital media file is returned, server 310 outputs the digital media file to remote device 304 for display (step 670).

Returning to the user-side, in step 680 the digital media file is received at remote device 304 and output for display on remote device 304. For example, an audiovisual player application may open and allow a user see and hear audiovisual content for that portion of the story. When the file is done playing, the user can return to the book, turn the page and continue reading the book and access audiovisual content through scanned codes until they finish the book.

Further Examples

Figure 7:
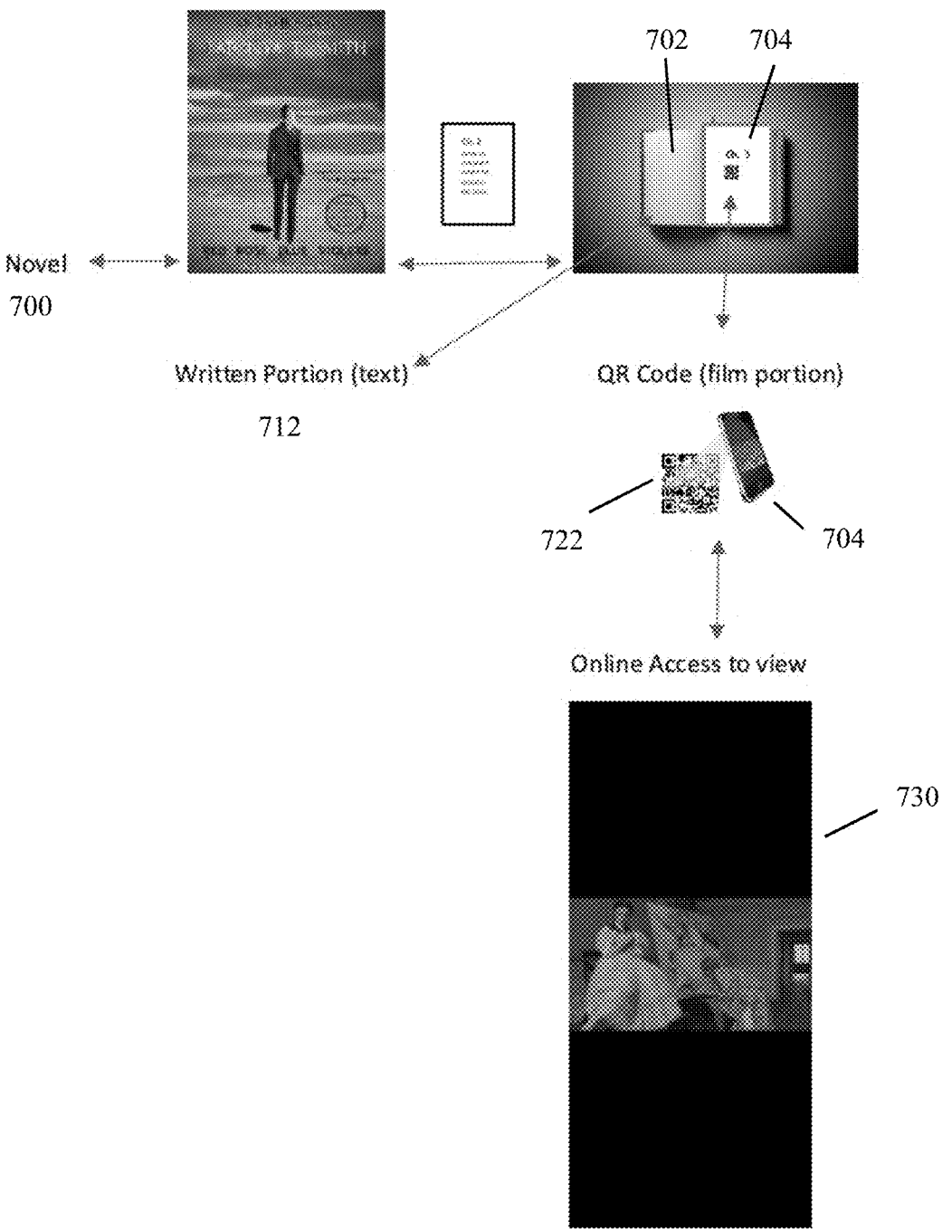
FIG. 7 is a diagram illustrating fused content generation for a story in a book having pages interspersed with optically readable codes according to one example.

FIG. 7 is a diagram illustrating fused content generation for a story in a novel 700 having pages interspersed with optically readable codes according to one example. Novel 700 has multiple pages of textual content interspersed with optically readable codes. For example, textual content 712 may be on one page 702. A QR code 722 (corresponding to a film/audiovisual content) may be on another page 704. A mobile device 704 with a browser and optical scanning device (e.g. camera and scanning application) may be used to scan QR code 722. Mobile device 704 is configured to communicate over a data network to access online content identified by information extracted from the scanned QR code. For example, the optical scanning device may optically scan optically readable code 722 in novel 700 to obtain code data. The code data includes information representative of a URL address and a file identifier, and the browser uses the URL address to communicate with a server 310 (or other content server) to request a digital media file 730 corresponding to the file identifier extracted from the coded data. Mobile device 704 then displays the audio or visual content in the digital media file 730 such that the user can continue the same story in the book 700 as prior textual content 712 presented in other portions of the book 700 for reading. In embodiments, the scanned optically readable code is a QR Code but is not so limited and other types of codes or scannable information may be used.

Intermission: A Living Article

Figure 8:
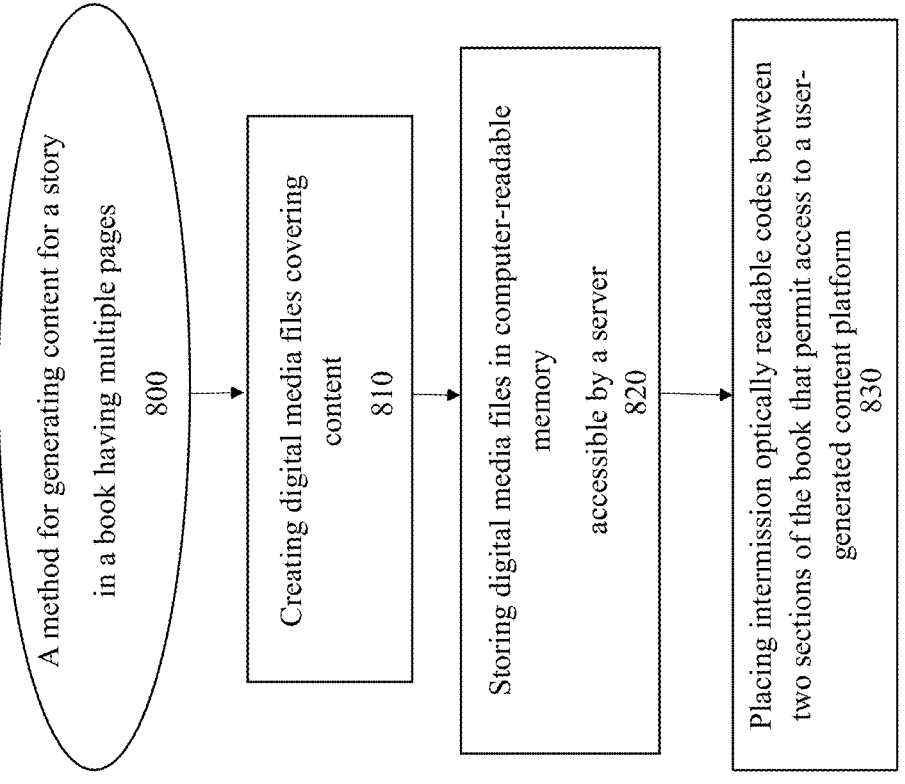
FIG. 8 is a flowchart diagram of a method for generating content for a story in a book having multiple pages according to an embodiment of the present invention.

FIG. 8 is an example of an alternative method 800 for generating content for a story in a book having multiple pages across different sections interspersed with optically readable codes (steps 810-830), wherein the optically readable codes dispersed throughout the pages of the book include one or more intermission optically readable codes. The intermission optically readable codes further permit a user to access corresponding social media content and functionality hosted on a social media platform.

At step 810, one or more digital media files covering content in the story are created. At step 820, the digital media files are stored in a computer-readable memory accessible by a server. Each digital media file has video and audio content covering a portion of the story of a respective section of the book, and each optically readable code identifies a respective digital media file. A person reading the book with an optical scanning device may read text on pages in some sections of the book and use the optical scanning device to scan one or more optically readable codes on pages in other sections of the book and access corresponding digital media files to consume the content of the entire story in the book as described above with respect to embodiments in FIGS. 1-7.

In a further feature, intermissions may be provided. At step 830, one or more intermission optically readable codes are placed between two sections of the book. An intermission optically readable code permits a user to access a user-generated content platform, such as, a social media content platform, by scanning the intermission optically readable code using a mobile device with an optical scanning device. The intermission optically readable codes, when scanned with an optical scanning device, can be used to additionally unlock user functionality on the mobile device for each user to generate content for inclusion on the user-generated content platform as described further below with respect to FIGS. 9-14.

For example, an author creates a book, such as a novel, a textbook, an autobiography, or cookbook. An intermission optically readable code, such as a QR code, is generated for that specific title and placed between sections of the book, such as between chapters in a novel. The QR code may correspond directly to the preceding or anteceding section, or multiple sections, or any combinations thereof. The reader may then scan or enter the QR code using a mobile device with an optical scanner. The QR code used for an intermission may unlock access to a user-generated content platform, where the user and other users who own physical copies of the same title may share content such as text, voice, picture, video, or audio to the content platform for the other users to view and interact with. These platforms may take many forms such as comment sections, online picture boards, video sharing forums, or any combination of social media features and shareable functionalities therein. For example, a user may finish reading a chapter of a book that has a particularly climactic story event occur in it. Between that chapter and the next may exist a QR code, which, once scanned by the user's mobile device, permits access to a comment section accessible through that particular QR code between those two particular chapters, wherein the comment section may be focused solely on discussing the events of that chapter and its climactic story event. The QR code may further unlock user functionality on the mobile device for the user. User functionality may include but is not limited to the ability to add, delete or modify text, voice, picture, video, or audio. For example, once access is permitted to the aforementioned user-generated content platform, the remote device may gain functionality in the form of a chat box and keyboard, for the writing and posting of comments. Comments may include various forms of shareable media such as photos, videos, or links to other online content. Other functionality include access to an external or internal camera app, which may access the camera functionalities of the remote device and allow for the sharing of taken photos or videos.

In a further embodiment, the intermission optically readable code may permit the user exclusive access to the user-generated content platform. For example, a comment section discussing a particular chapter of a book, chapter 3, may be exclusively accessible through the specific intermission optically readable code placed on the page at the end of chapter 3. Thereby, a user may read chapter 3, scan the intermission optically readable code, and be granted access to that specific comment section. That comment section may only be accessible through that intermission optically readable code and others like it in other copies of the book, and not by the intermission optically readable codes located elsewhere in the book. The QR code may further include information representative of a URL address for a server hosting a respective user-generated content platform. In other embodiments, the URL address will not grant access to the respective user-generated content platform if entered into a browser or other internet searching means.

In this way, only holders of a physical book having the intermission optically scannable codes (e.g., QR codes) can access the corresponding user-generated content platform, thereby creating a wholly exclusive article contained within the pages of the physical copies of the book and corresponding social media content. The content generated by users and shared on the user-generated content platforms may be updated in real-time, and viewable in all copies of the book in real-time, according to some embodiments. Each holder of a physical copy of the book has access to the content left by the other book owners. This creates a user network for additional content generation relating to the book content only accessible through the physical copies of the book. Users who purchase or obtain physical copies of the book may consume the story and receive exclusive access to shared content amongst other owners of the same book. The shared content is updated dynamically in real time. In this way, users consuming a story can experience an intermission where they view user-generated comments, such as, commentary, reviews, more story content, and other thoughts, posted on the user-generated content platform. This creates a living article wholly contained within the books but still virtually accessible by remote devices. The more people engage, the more content is added to the book, making it a living article.

FIG. 9 further illustrates steps in method 800 (steps 835-860) for accessing a user-generated content platform during an intermission. In an embodiment, Step 835 may be performed by a remote device communicating with the server. Steps 840-860 may be performed by a server.

Step 835 involves optically scanning a first intermission optically readable code in a book with a scanning device to obtain code data and outputting a signal representative of the code data to a server. For example, the scanning device may be a mobile device having a camera and scanning application for scanning the first intermission optically readable code. The mobile device further has a transceiver for communicating with the server over a data network. The code data may further include a device identification and a QR code identification, and is further described herein.

In step 840, a signal representative of a first scanned intermission optically readable code in the book is received by a server. This received signal may be the signal having code data output in step 835. Next, a user-generated content platform corresponding to the first scanned intermission optically readable code is accessed (step 850). Content from the accessed user-generated content platform is then output by the server to a display device (step 860).

Figure 10:
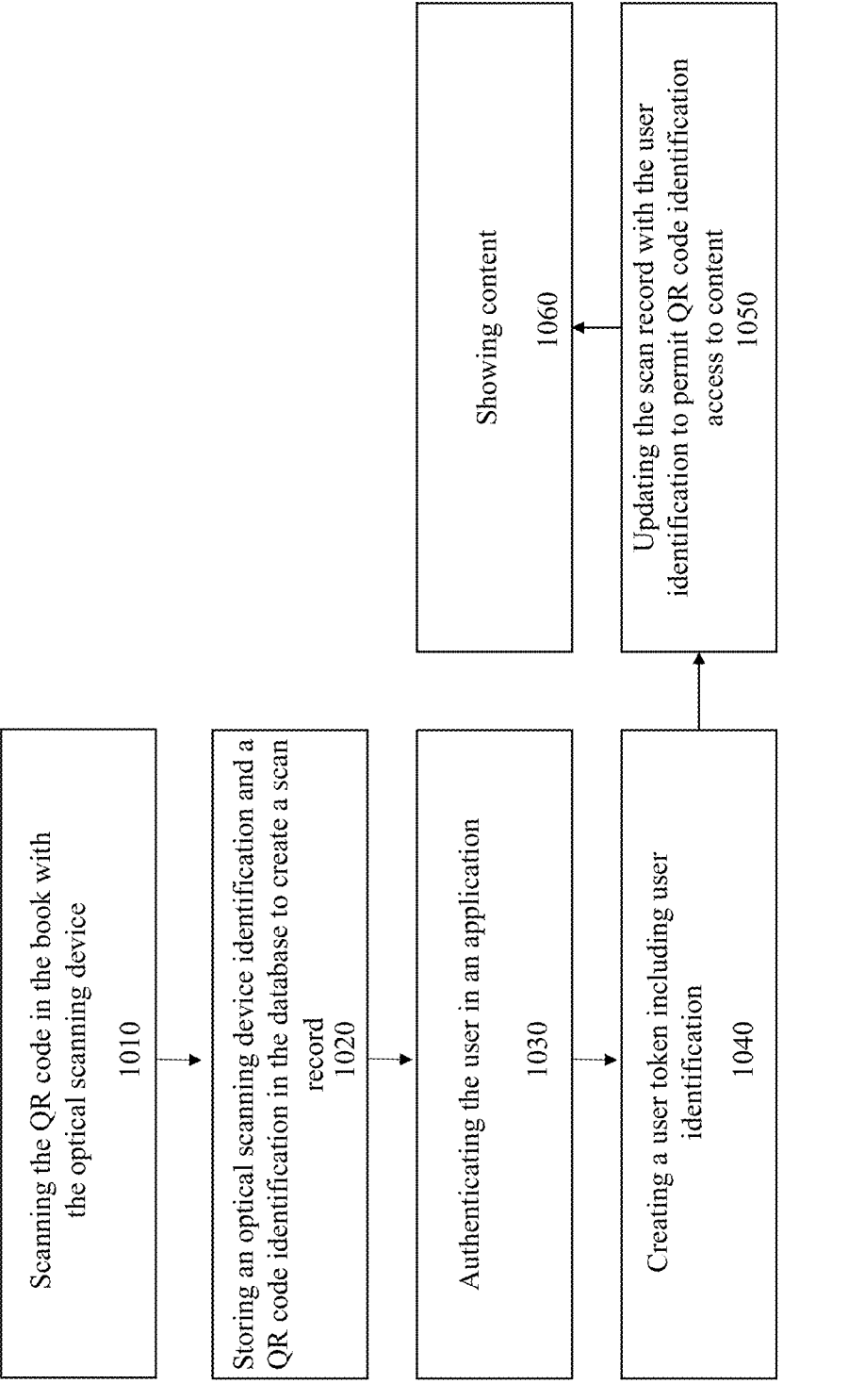
FIG. 10 is a flowchart diagram of a lock and key process according to an embodiment of the present invention.

In some embodiments, exclusively accessing the user-generated content platform may be enabled by a lock and key process 1000. FIG. 10 is an example of a lock and key process 1000 according to at least one embodiment consistent with the present disclosure. The lock and key process 1000 includes scanning the QR code in the book with the optical scanning device at step 1010; storing an optical scanning device identification and a QR code identification in the database to create a scan record at step 1020; authenticating the user in an application at step 1030; creating a user token including a user identification at step 1040; updating the scan record with the user identification to permit QR code identification access to content at step 1050; and showing content at step 1060. The operation of lock and key process 1000 is further described herein with respect to lock and key system 1300 depicted by FIG. 13 and in illustrative diagram FIG. 14.

Figure 11:
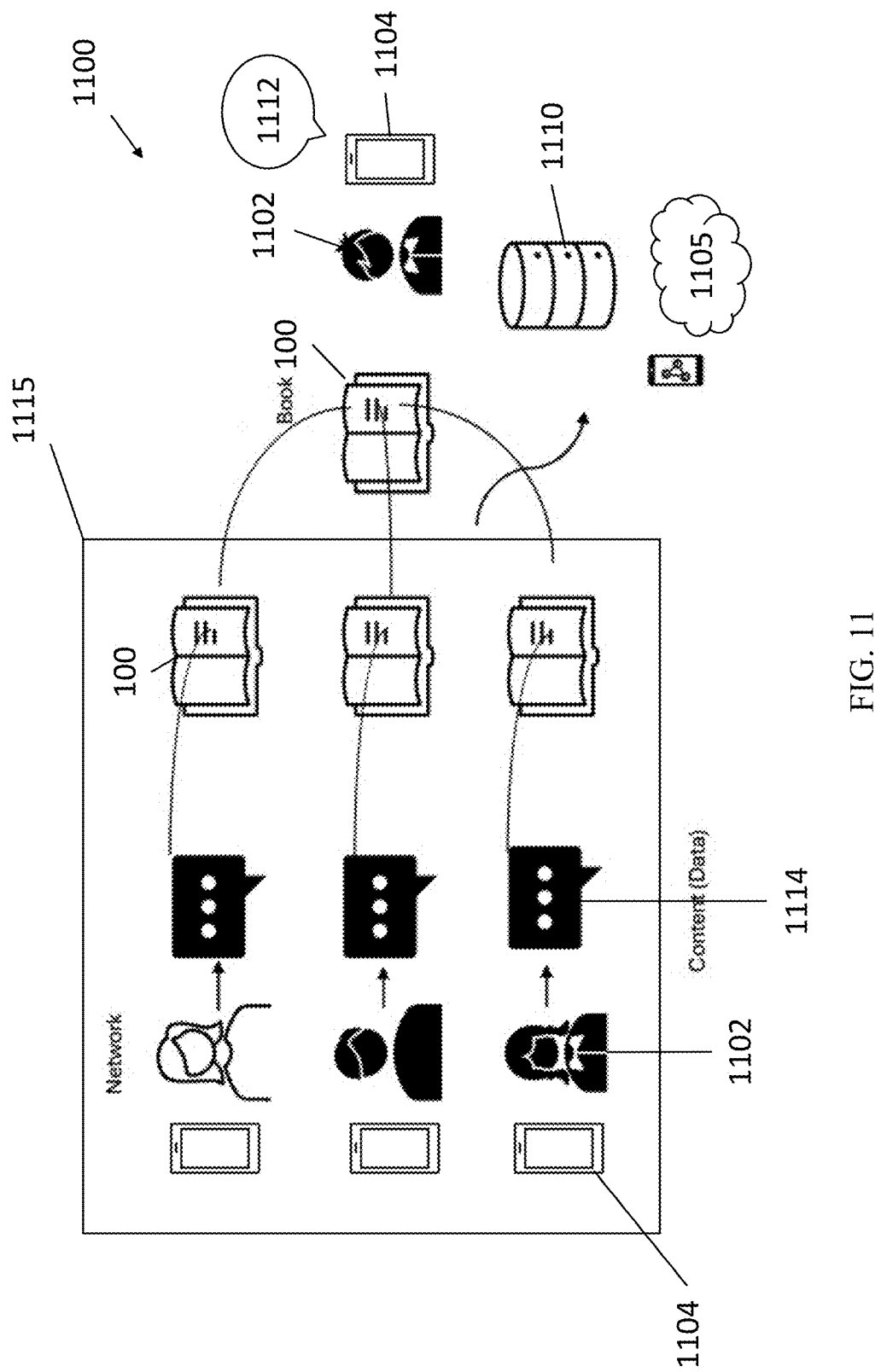
FIG. 11 is a diagram of a system for generating content for a story in a book having multiple pages interspersed with optically readable codes according to one example.

FIG. 11 is a diagram of a system 1100 for serving content for a story in a book 100 having multiple pages with textual content interspersed with one or more optically readable codes including intermission optically readable codes according to an embodiment. System 1100 includes a server 1110 coupled over a data network 1105 to one or more remote devices 1104. Server 1110 is configured to communicate with remote devices 1104 over data network 1105. Remote devices 1104 may be one more computing devices operated by respective users 1102. Server 1110 may be implemented on one or more computing devices. Data network 1105 may be any type of computer data network or combination of networks such as the Internet. Server 1110 is further configured to communicate with a user-generated content platform 1115 over data network 1105. User-generated content platform 1115 includes one or more databases 1120 for storing content 1114.

In operation, a user 1102 reads book 100 while operating a remote device 1104, such as a mobile device including a smart phone, that can communicate with server 1110. Server 1110 is configured to receive signals from remote devices 1104 that represent the information in scanned optically readable codes 222 in the book 100, permit access to a user-generated content platform 1115 corresponding to that optically readable code 222, and then permit access to user functionality 1112 to the remote device 1104 for display to a user 1102. The user-generated content platform 1115 is configured to host content 1114 stored on one or more databased 1120, where the content 1114 is created and shared by other users 1102 who own a copy of the book 100.

In one embodiment, a QR code may include a QR code identification (ID) containing information representative of a URL address for a server hosting a respective user-generated content platform 1115 at or accessible by server 1110. Server 1110 can then request access to the user-generated content platform 1115 for display, as well as user functionality 1112 to the remote device 1104. For example, once a optically readable code 222, server 1110 sends a request for the user-generated content platform 1115 based on the URL address integrated into that optically readable code 222. Hosting server then returns content from the user-generated content platform 1115 to server 1110 for forwarding to remote device 1104 for viewing and interaction via the user functionality 1112 by user 1102.

The operation of system 1100 is further described herein with respect to computer-implemented methods for producing and consuming content in FIGS. 8-10 and in illustrative diagram FIG. 12.

Figure 12A:
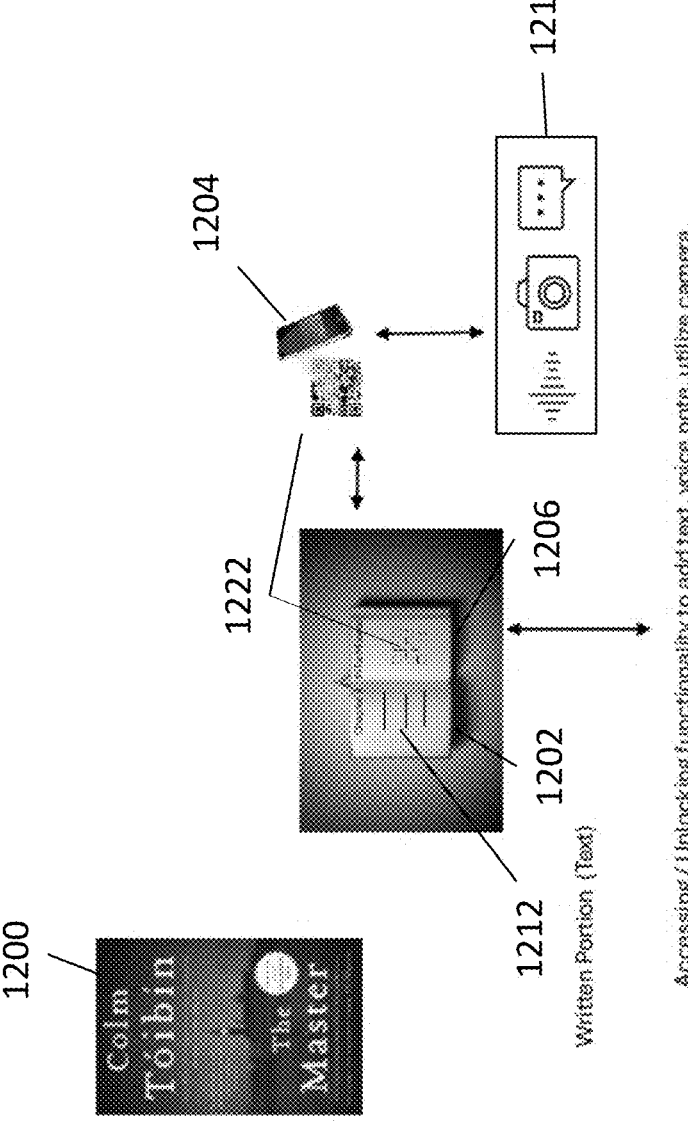
FIGS. 12A and 12B are diagrams illustrating a system for consuming content for a story in a book having pages interspersed with optically readable codes according to one example.
Figure 12B:
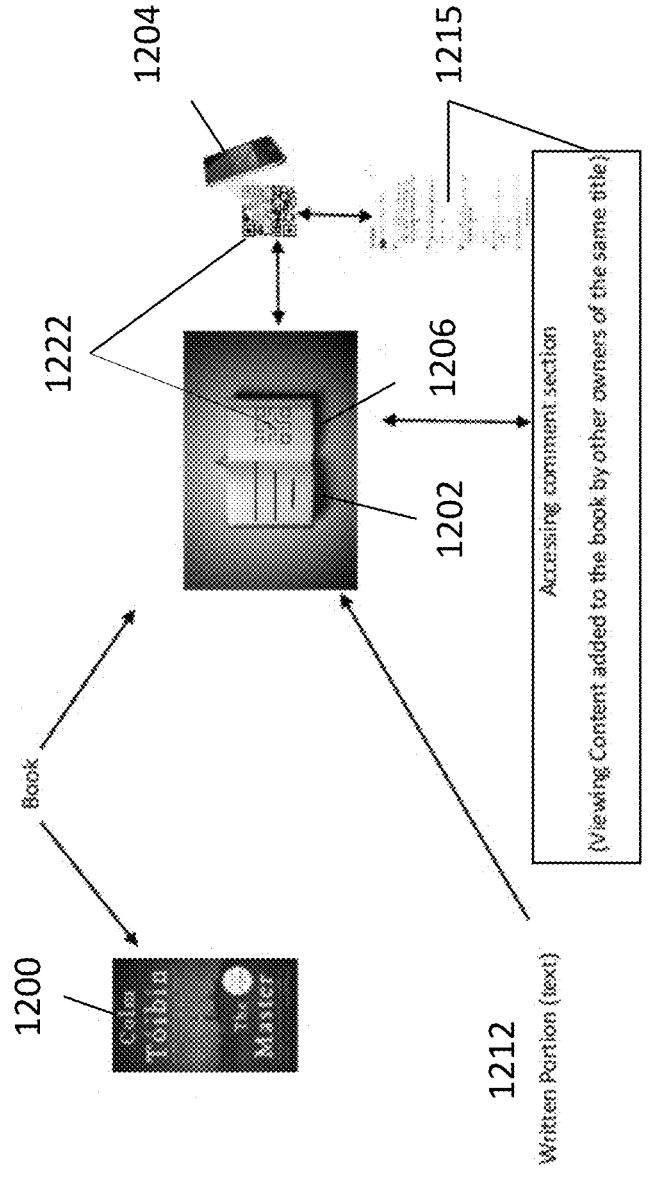

FIGS. 12A and 12B are diagrams illustrating serving content for a story in a book 1200 having multiple pages with textual content interspersed with one or more optically readable codes including an intermission optically readable code according to an embodiment. Book 1200 has multiple pages of textual content interspersed with optically readable codes. For example, textual content 1212 may be on one page 1202. A QR code 1222 (corresponding to a user-generated content platform 1215 shown in FIG. 12B) may be on another page 1206. A mobile device 1204 with a browser and optical scanning device (e.g. camera and scanning application) may be used to scan QR code 1222. Mobile device 1204 is configured to communicate over a data network to access an online user-generated content platform 1215 identified by information extracted from the scanned QR code 1222. For example, the optical scanning device may optically scan optically readable code 1222 in book 1200 to obtain code data. The code data may include a device ID and a QR code identification. The QR code identification may contain information representative of a URL address, and the browser uses the URL address to communicate with a server 1110 (or other content server) to request access to a user-generated content platform 1215 corresponding to the code data extracted from the optically readable code 1222, according to at least one embodiment. Mobile device 1204 then displays the user-generated content platform 1215 such that the user can view content 1114 created by other users 1102 regarding the story in the book 1200 in real time to supplement their interactive experience with the story. The QR code 1222 further permits access to user-functionality 1216 on their mobile device 1204, which allows them to create, share, and/or interact with content 1114 on the user-generated content platform 1215. For example, the user-functionality 1216, as shown in FIG. 12A, may allow them to post comments, images, take and share pictures with their mobile device 1204, or "like" other users' content 1114. In embodiments, the scanned optically read-able code is a QR Code but is not so limited and other types of codes or scannable information may be used.

Lock and Key

Figure 13:
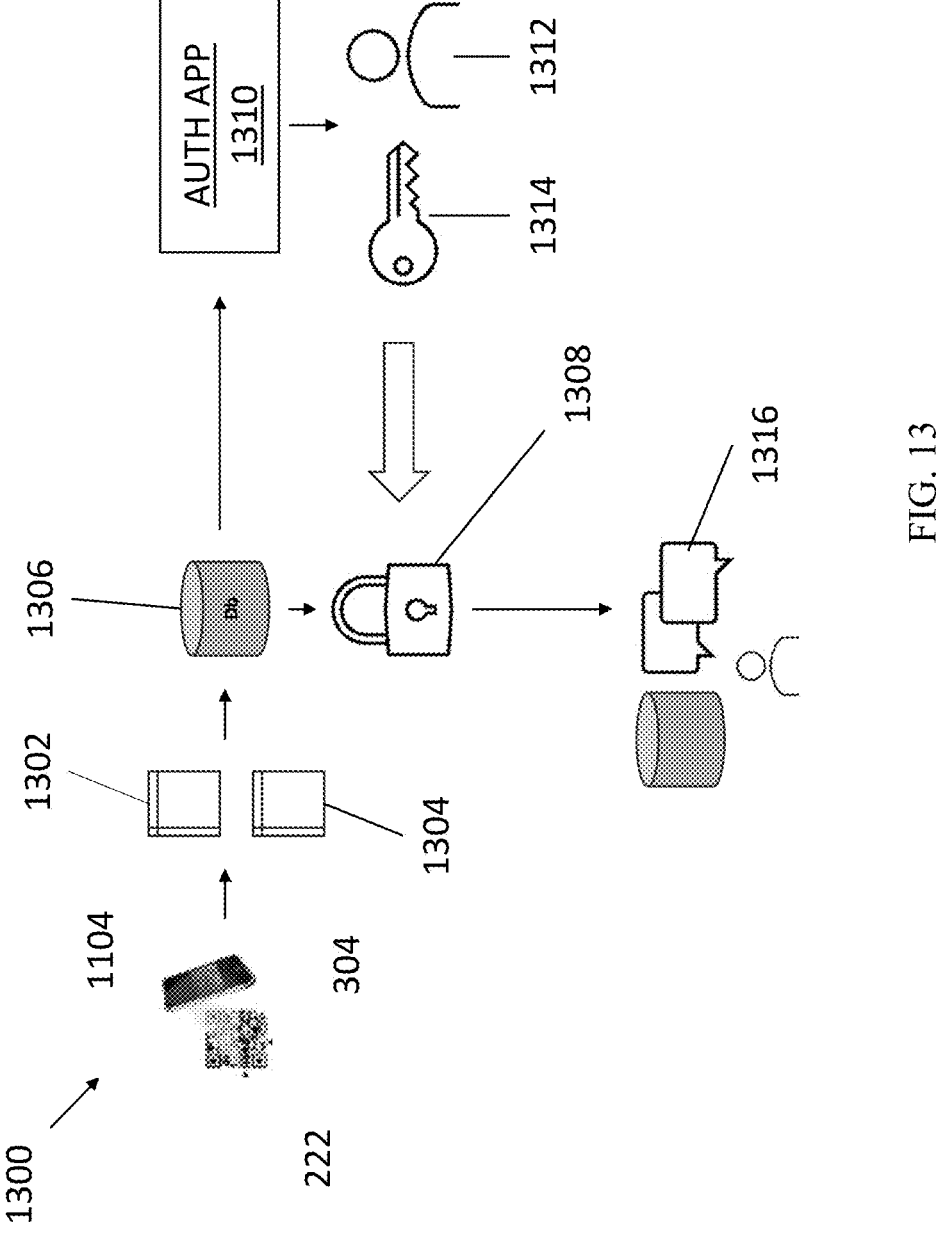
FIG. 13 is a diagram illustrating a lock and key system according to one embodiment consistent with the present disclosure.

FIG. 13 is a diagram of a lock and key system 1300. The lock and key system 1300 includes an optical scanning device identification 1302 and a QR code identification 1304 generated by scanning the QR code 222 in the book 100 with the optical scanning device 304. The optical scanning device identification 1302 may be a unique identifier assigned to the optical scanning device, such as a smartphone or tablet containing an optical scanner, which may be used to track and identify the device across various servers and applica-tions. For example, the optical scanning device identification may be, but is not limited to, a international mobile equip-ment identity (IMEI), a media access control address (MAC address), or a serial number. The optical scanning device identification 1302 may also be a unique identifier assigned to the user of the device, such as a user's account informa-tion. Similarly, the QR code identification 1304 may be a unique identifier assigned to the scanned QR code and may contain information corresponding to a specific piece of content. For example, the QR code identification 1304 may include a URL address to access a specific piece of content corresponding to the identifying characteristic of the QR code identification 1304, for example. A database 1306 is configured to store the optical scanning device identification 1302 and the QR code identification 1304, thereby creating a scan record 1308. An application 1310 is configured to authenticate the user 1102. Once the user 1102 is authenti-cated, a user token 1312 is created from the authentication, wherein the user token 1312 includes a user identification 1314. The scan record 1308 is updated with the user identification 1314 to unlock access to content 1316 stored on a second database 1318, the content 1316 corresponding to the QR code identification 1304, thereby displaying the content 1316 on the remote device 1104. Content 1316 is configured to be accessed and displayed on the remote device 1104. As illustrated, the user identification 1314 acts as the "key" to unlock the scan record 1308 "lock", thereby allowing the QR code identification 1304 to identify the previously inaccessible corresponding content 1316 stored on the second database 1318.

Figure 14:
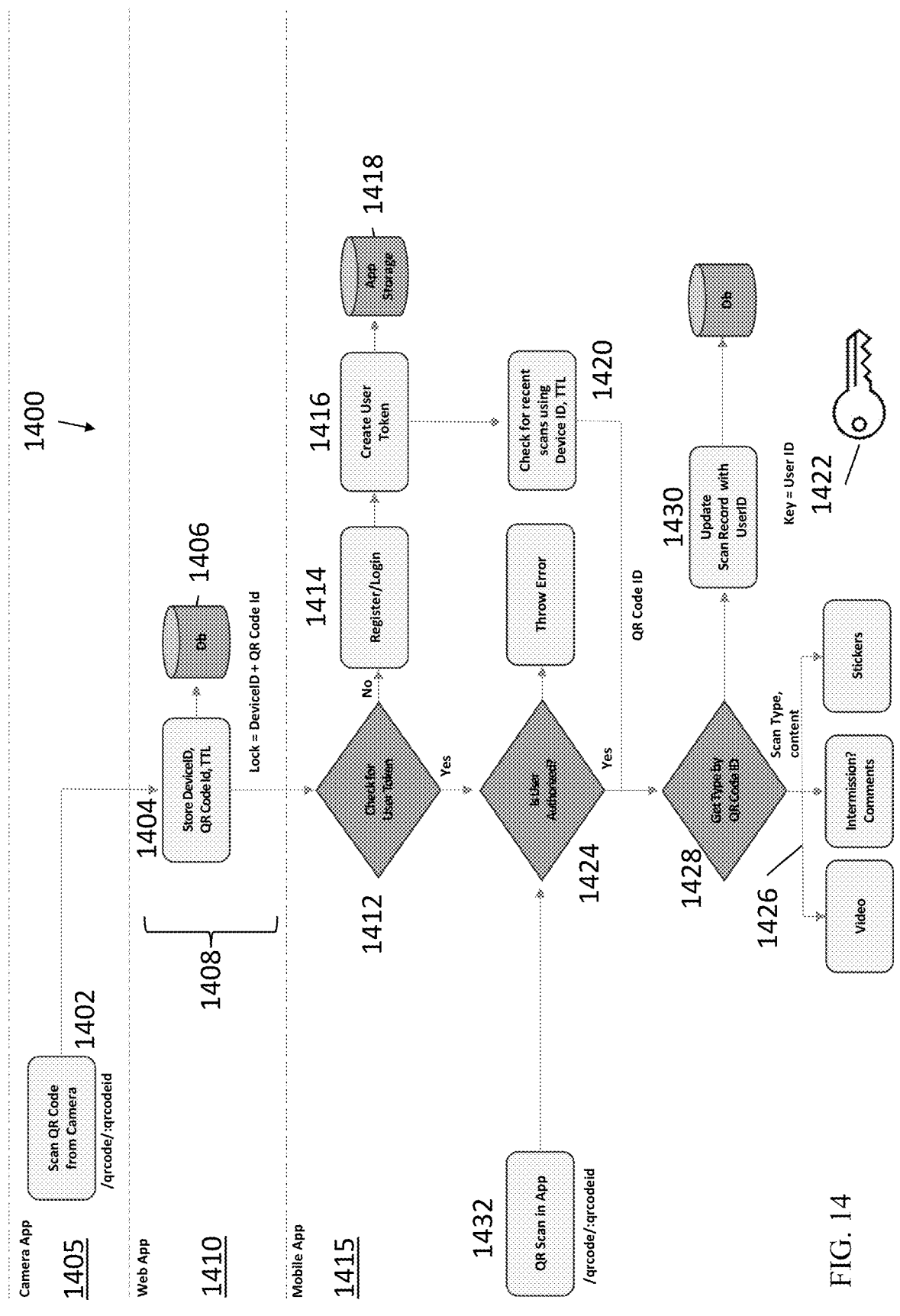
FIG. 14 is a diagram depicting an example of a lock and key process and a lock and key system according to an embodiment of the present disclosure.

The operation of lock and key system 1300 is further described herein with respect to computer-implemented versions of lock and key process 1000 depicted by FIG. 10 and in illustrative diagram FIG. 14.

FIG. 14 is a diagram depicting an example of a lock and key process 1000 in conjunction with a lock and key system 1300 according to at least one embodiment consistent with the present disclosure. As illustrated, a QR code is scanned from a camera at 1402. The scanning of the QR code via a camera may be conducted in a camera app 1405 in com-munication with a database 1406. The camera app 1405 may be any application with picture or video recording capability, such as the Apple™ camera app or Snapchat™ app. The scanning of the QR code via the camera retrieves a device ID and a QR code ID that uniquely correspond to the remote device 1104 and the QR Code 222 and are then stored at 1404 in the database 1406, defining a scan record which serves as a "lock" 1408. A web app 1410 may be utilized for these steps. A web application may be application function-ality accessed through a browser or may be a separate standalone application that can run on an operating system.

A user token may then be checked for at 1412. A user token may be created at the start of each new session (such as when a user opens an application or first connects with a server). For example, a user token may be a Json Web Token (JWT). The header may consist of two parts: the type of the token, such as JWT, and a signing algorithm being used, such as HMAC SHA256, for example.

If a user token is absent, a user either registers or logs into an authentication application ("app") or process to create a user token at 1414 and 1416. A user token may also be "remembered" from previously successfully access attempts, through which they may be stored in authentica-tion app storage 1418 and recalled for authentication at 1420. The recall may include checking for recent scans using the device ID and TTL ("time to live" i.e., how long a packet of data can exist on a network until it is discard). Once a user token is acquired, it further comprises a payload, which includes a user ID 1422, user type, and TTL. The user ID 1422 serves as a "key". The user is then authorized at 1424. Once authorized, the lock 1408 is updated at 1430 with the user ID 1422, thereby "unlocking" access to the restricted content 1426. The type of content 1426 is selected via the QR code identification which corresponds to a specific content platform and access to user functionality corresponding to that specific content platform at 1428. For example, the QR code identification may be unique for a particular comment section, allowing the user to access functionality to write comments or respond to the comments posted in the comment section by other users. This QR code identification for example can be a URL address identifying the specific content platform and the comment section therein. Mobile app 1415 capability may be the utilized t for the aforementioned steps. Additionally, in some embodi-ments, the QR scanning 1432 may occur within the mobile app 1415, as illustrated.

As described above, the content generated by the users may be updated in real time and viewable by other users in real time through their own respective copies of the book and their mobile devices. For access to said content to be exclusive, the intermission QR codes may serve as a lock and key. The QR codes are not just merely a link to the data and content on an external site or platform—they are per-mission to it. The user-generated content platforms may not be accessed by external means. The online addresses of the user-generated content platforms may not be entered into traditional browsers or web applications to access the plat-forms—only by the code provided in the book's physical copy. Each holder of a copy of the title of the book has exclusive access to content left by other book holders. Such a system creates a network inside the book and a database for the content, only accessible through the book's physical copy. For example, with reference to FIG. 14, a user may scan a QR code in a book with the camera app on their mobile phone or tablet or other remote device. Once scanned, the lock and key system stores a QR code identi-fication and a device identification corresponding to the QR code scanned and the device used to scan the code, as a scan record. The lock and key system then checks if the user has permission to access the content. A user may have had their access approved recently, and thus the system recalls the previous allowance and automatically permits access to the user. Alternatively, the system may prompt the user to authenticate their profile, such as by initiating a login to an external application. For example, they could be prompted to register and/or login to a user account for that specific book. Once authenticated, the system creates a key to unlock access, and recalls the previously stored QR code identification in the scan record, such as a URL address, that pertains to a certain comment section for a certain chapter, and then permits access to that comment section, as well as access to user functionality for the user, like prompting a keyboard and a chat box to post their own comments.

In the examples above, a URL address is used to demonstrate an example of a QR code identification configurable to call for specific user-generated content or access to user functionality, however a QR code identification may include various other unique identifier forms or technologies without departing from the present disclosure. Similarly, a device identification may further include unique identifiers tied to a user of a device and not necessarily the device itself without departing from the present disclosure. For example, a device identification may include a user's account information that may be accessible through the device.

Further Embodiments and Example Implementations

Books 100 and 700 are illustrative and not intended to be limiting. Books in embodiments may have textual context and optically readable codes interspersed in any order across one more pages depending on a particular book and the story an author tells or producer wishes to produce. An author may write a book with portions of the content in text and other portions of the content in film or video recordings. For example, Chapter 1 of a fictional novel is written in text while Chapter 2 of the novel is film or motion picture content.

In embodiments, the story may be a novel having multiple chapters, and the first group of sections comprise one set of chapters and the second group of sections comprise another set of chapters, such that the reader may experience a fusion of textual content in the one set of the chapters and audiovisual content in the second set of chapters. For example, TAHARA is a fictional book series about a woman trying to navigate through friendships, relationships, and her own personal entrepreneurship. Six chapters are written in text within the pages of the book. Four other chapters are filmed and recorded with real actors and actresses. These four chapters are exclusively accessed within the pages of the book by scanning four QR codes located in the pages and viewing the episodes via the user's smartphone.

In embodiments, the book may contain an alternating sequence of chapters presenting textual content and chapters presenting audiovisual content to cover an entire single story. For example, the book can contain any combination or sequence of the chosen media, such as ten chapters of text and 1 chapter of audiovisual content, or an equal 5 chapters of each. Other combinations, ordering of sections and pages, and configurations may be used as would be apparent to a person skilled in the art.

In a further embodiment, a book having content for a story, comprises: a book binding and a plurality of pages held in place by the book binding; a first group of sections having at least textual content on pages covering respective portions of the story; and a second group of sections having optically readable codes on pages, wherein the optically readable codes encode information to access respective digital media files having audiovisual content covering respective portions of the story different than the portions of the story covered by the first group of sections, wherein the first and second groups of sections cover the entire story of the book. The book has a story that comprises a novel having multiple chapters, and the first group of sections comprise one set of chapters and the second group of sections comprise another set of chapters, such that a reader may experience a fusion of textual content in the one set of chapters and audiovisual content in the second set of chapters. The book has an alternating sequence of chapters presented with textual content and chapters presented with audiovisual content to cover an entire single story.

For all the above embodiments, the following examples expand upon the definitions of consistent terminology. For all the above embodiments, the following examples are illustrative and not intended to be limited.

In embodiments, remote devices 304, mobile devices 704, remote devices 1104, mobile devices 1204, and optical scanning devices can be any electronic computing device with optical code reading capabilities. An optical scanning device may be a mobile device or a remote device having a camera and a scanning application or may be a mobile device or remote device coupled to a separate optical scanning device. Example computing devices with optical code reading capability may include, but are not limited to, a smartphone; smart glasses; VR/AR headset; a camera; a personal computer; a laptop computer; a personal digital assistant; a data-enabled cellular telephone; kiosk; embedded device; console; or a notebook or tablet computer. In addition to at least one processor and memory, such a device may include software, firmware, hardware, or a combination thereof. Software may include one or more applications, a browser, and an operating system. Operating systems may include, but are not limited to, Microsoft Windows™; Android™; WebOS™; or iOS™ or a custom operating system. Hardware can include, but is not limited to, a processor, memory, display or other input/output device. A communication interface and transceiver can be included to perform data communication (wired or wireless) over network 305.

In embodiments, examples of digital media files include, but are not limited to, MPEG-1, AVI, MPEG-4, and MOV for video files; MP3, WAV, AAC, for audio files; and JPEG, GIF, and PNG for picture files.

Audio and visual content can be, but are not limited to, movies on film or digital mediums, stop-motion animation, computer-generated imaging, music videos, audio narration, music, and ambiance noises and sounds.

In embodiments, optically readable codes can be any code that can be read and interpreted via a picture-scanning device or optical scanner including, but not limited to, QR Codes, Barcodes, and RFID codes.

In embodiments, data network 305 and data network 1105 can be any data network including, but not limited to, a local area network, a wide area network, or an intranet. Data network 305 and data network 1105 may be connected to one or more secondary networks, examples of which include, but are not limited to, a local area network, a wide area network, or an intranet.

Aspects of the embodiments for exemplary system 300 and system 1100 including server 310 and server 1105 (and remote devices 304, mobile devices 704, remote devices 1104, and mobile devices 1204) and database 320, database 1120, and database 1306 thereof may be implemented electronically using hardware, software modules, firmware, tangible computer readable or computer usable storage media having instructions stored thereon, or a combination thereof and may be implemented in one or more computer systems or other processing systems. In embodiments, server 310 and server 1105 (and remote devices 304, mobile devices 704, remote devices 1104, and mobile devices 1204) and database 320, database 1120, and database 1306 may be implemented electronically using hardware, software modules, firmware, tangible computer readable or computer usable storage media having instructions stored thereon, or a combination thereof and may be implemented in one or more computer systems or other processing systems at the same location or different locations.

Database 320, database 1120, or database 1306, for example, may be a database platform running database management software available from an organization such as a commercial vendor or open source community.

Embodiments may be directed to computer products comprising software stored on any computer usable medium such as memory. Such software, when executed in one or more data processing devices, causes such data processing device(s) to operate as described herein.

In an embodiment, system 300 and system 1100 including server 310 or server 1105 and database 320, database 1120, or database 1306 may be implemented in an architecture distributed over one or more networks 305 or 1105, such as, for example, a cloud computing architecture. Cloud computing includes, but is not limited to, distributed network architectures for providing, for example, software as a service (SaaS); infrastructure as a service (IaaS); platform as a service (PaaS); network as a service (NaaS); data as a service (DaaS); database as a service (DBaaS); backend as a service (BaaS); test environment as a service (TEaaS); application programming interface as a service (APIaaS); or an integration platform as a service (IPaaS).

In embodiments, server 310 or server 1105 may be coupled to one or more web servers to support World Wide Web protocols and services. Server 310 or server 1105 may also communicate with other servers or applications and may send and retrieve data through application programming interfaces (APIs). Server 310 or server 1105 may also be part of a cluster of servers or other architectures such as an API gateway architecture having a gateway API and a cluster of servers.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices; but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other integrated circuit (IC) (such as, for example, a field-programmable gate array (FPGA) or an ASIC); a hard disk; an HDD; a hybrid hard drive (HHD); an optical disc; an optical disc drive (ODD); a magneto-optical disc; a magneto-optical drive; a floppy disk; a floppy disk drive (FDD); magnetic tape; a holographic storage medium; a solid-state drive (SSD); a RAM-drive; a SECURE DIGITAL card; a SECURE DIGITAL drive; or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable, or machine-readable, instructions. These computer-executable instructions may be provided to one or more processors of a general-purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner such that the instructions stored in the computer-readable memory result in an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The terminology used herein is for the purpose of describing particular embodiments only and is not intended to be limiting of the invention. As used herein, for example, the singular forms "a," "an," and "the" are intended to include the plural forms as well unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method for generating content for a story in a book having multiple pages across different sections interspersed with optically readable codes, comprising:

storing one or more digital media files in computer-readable memory accessible by a server, each digital media file having video and audio content covering a portion of the story of a respective section of the book, and wherein each optically readable code identifies a respective digital media file, whereby, a person reading the book with an optical scanning device may read text on pages in some sections of the book and use the optical scanning device sections to scan optically readable code on pages in other sections of the book and access digital media files to consume the content of the entire story in the book; and placing an intermission optically readable code between two sections of the book, wherein the intermission optically readable code permits a user to access a user-generated content platform by scanning the intermission optically readable code with an optical scanning device, wherein the intermission optically readable code permits the user exclusive access to the user-generated content platform and includes a QR code having information representative of a URL address for a server hosting a respective user-generated content platform, wherein the URL address will not grant access to the respective user-generated content platform if entered into a browser.

2. The method of claim 1 wherein the intermission optically readable code further unlocks access to user functionality on the optical scanning device for each user to generate content.

3. The method of claim 1, further comprising:

receiving, by the server, a signal representative of a first scanned intermission optically readable code in the book;

accessing the user-generated content platform corresponding to the first scanned intermission optically readable code; and outputting content from the accessed user-generated content platform to a display device.

4. The method of claim 3, further comprising:

optically scanning the first scanned intermission optically readable code in the book with a scanning device to obtain code data; and outputting a signal representative of the code data to the server.

5. The method of claim 1, wherein exclusively accessing the user-generated content platform uses a lock and key process.

6. The method of claim 5, wherein the lock and key process comprises:

scanning the QR code in the book with the optical scanning device;

storing an optical scanning device identification and a QR code identification in the database to create a scan record;

authenticating the user in an application;

creating a user token including a user identification;

updating the scan record with the user identification to permit QR code identification access to content; and showing content.

7. The method of claim 3, wherein the output content includes comments or input from multiple users having copies of the book and is updated in real time.

* * * * *